US012669403B2

(12) United States Patent
Batarseh et al.

(10) Patent No.: US 12,669,403 B2
(45) Date of Patent: Jun. 30, 2026

(54) MEASURING WELLHEAD DISPLACEMENT USING BEAM DEFLECTION

(71) Applicant: Saudi Arabian Oil Company, Dhahran (SA)

(72) Inventors: Sameeh Issa Batarseh, Dhahran (SA); Damian Pablo San Roman Alerigi, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 163 days.

(21) Appl. No.: 18/782,855

(22) Filed: Jul. 24, 2024

(65) Prior Publication Data

US 2026/0029298 A1      Jan. 29, 2026

(51) Int. Cl.
G01M 5/00          (2006.01)
E21B 41/00         (2006.01)

(52) U.S. Cl.
CPC ............. G01M 5/005 (2013.01); E21B 41/00 (2013.01); G01M 5/0091 (2013.01)

(58) Field of Classification Search
CPC ..... G01M 5/005; G01M 5/0091; E21B 41/00; E21B 33/03; E21B 47/00; G01B 5/0014; G01B 11/2513
See application file for complete search history.

(56) References Cited

U.S. PATENT DOCUMENTS 4,500,206 A     2/1985   Cole et al.
5,467,184 A    11/1995   Tenjimbayashi 9,964,495 B1    5/2018   Marshall et al.
11,454,108 B2   9/2022   Alelaiwy et al.
11,525,667 B2  12/2022   Burns et al.
11,692,434 B2*  7/2023   Arji ..................... E21B 47/0025
                                                166/250.08
11,725,504 B2   8/2023   Alerigi et al.
2002/0166386 A1 11/2002  Hiyoshi
2004/0145744 A1  7/2004   Dobschal et al.
2017/0218715 A1* 8/2017  Whitaker ................ E21B 33/03
2018/0163500 A1* 6/2018  Levert ..................... E21B 33/04
2022/0252703 A1  8/2022   Nguyen (Continued)

FOREIGN PATENT DOCUMENTS

EP          1319926 B1    5/2014
GB          1518287 A     7/1978

OTHER PUBLICATIONS

Geng, "Structured-light 3D surface imaging: a tutorial," Advances in Optics and Photonics, 2011, 3:128-160, 33 pages.

*Primary Examiner* — Tarifur R Chowdhury
*Assistant Examiner* — Carlos Perez-Guzman
(74) *Attorney, Agent, or Firm* — Fish & Richardson P.C.

(57)          ABSTRACT

Systems and methods for performing contactless wellhead displacement measurements in a desert environment include adjusting an alignment of optical components in an optical system based on a temperature of the optical system. A pattern of infrared light is projected from the optical system onto a portion of a wellhead, the infrared light having a wavelength away from water absorption wavelengths and solar maxima wavelengths. Reflections of the pattern of infrared light from the portion of the wellhead are captured using an imaging sensor of the optical system. A displacement of the wellhead is measured based on the projected pattern of infrared light and the reflections.

20 Claims, 6 Drawing Sheets

(56) References Cited

U.S. PATENT DOCUMENTS

2022/0326006 A1 * 10/2022 Frot ..................... G01B 11/161
2022/0372868 A1 * 11/2022 Alerigi ................. E21B 47/002
2022/0390709 A1   12/2022 Hetzler

* cited by examiner

500

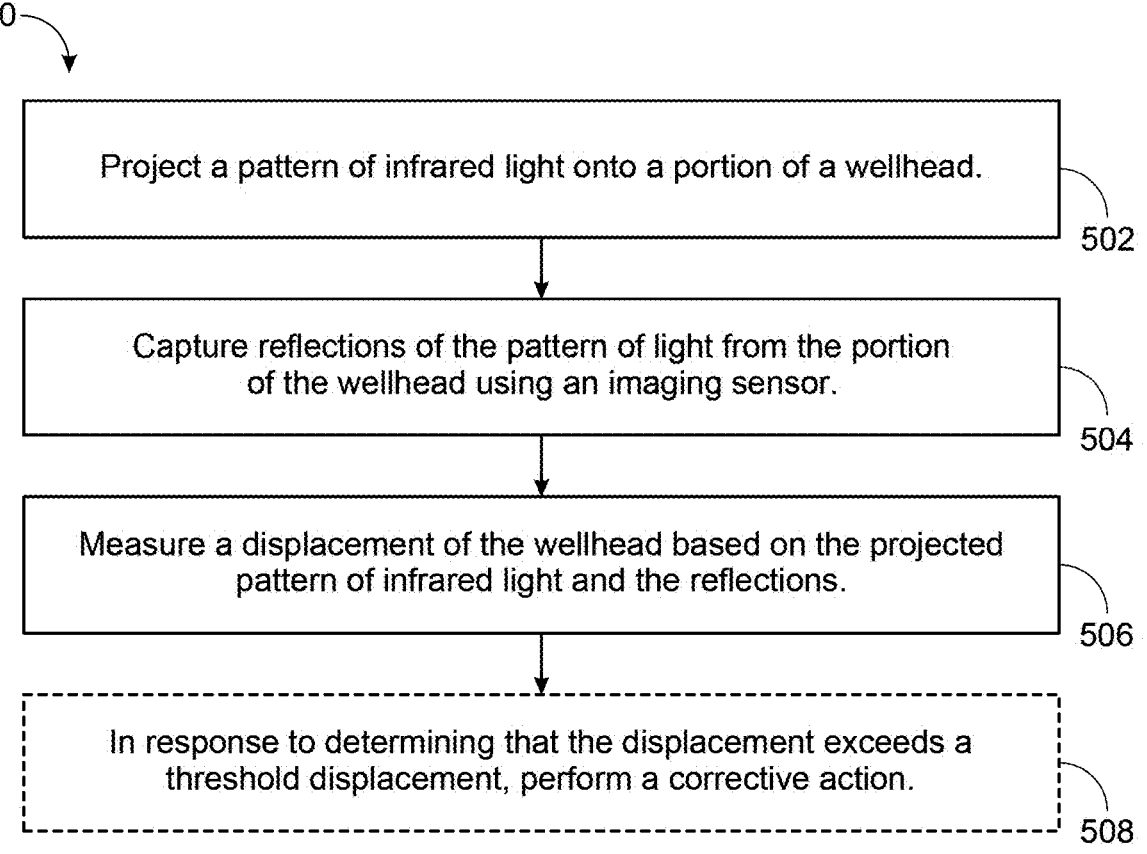

Project a pattern of infrared light onto a portion of a wellhead.

502

Capture reflections of the pattern of light from the portion of the wellhead using an imaging sensor.

504

Measure a displacement of the wellhead based on the projected pattern of infrared light and the reflections.

506

In response to determining that the displacement exceeds a threshold displacement, perform a corrective action.

MEASURING WELLHEAD DISPLACEMENT USING BEAM DEFLECTION

TECHNICAL FIELD

This disclosure generally relates to measuring wellhead displacement.

BACKGROUND

Wellheads and hydrocarbon production surface structures can be subject to complex forces and thermal gradients that cause structural changes or damage including, for example, anisotropic dilation, fatigue, and displacement, among others. These effects can damage the wellheads, the surface structures, or both. Conventionally, structural changes are measured manually as part of routine inspections. Times that measurements are taken may be sporadic due to the number of wells, remote locations of the wells, and weather conditions.

SUMMARY

Wellheads are a critical part of oil/gas/geothermal drilling, completion, and production systems, acting as both the structural and pressure containing interface. Wellheads include equipment mounted at the opening of the well to regulate and monitor hydrocarbon extraction from a subsurface formation, and typically includes three components: a casing head, a tubing head, and a production tree (colloquially known as a Christmas tree). The casing head can be fitted with valves and plugs to access the well casing. The tubing head can position the tubing correctly in the well and provides reliable well access. The tubing head can be sealed to enable removal of the production tree with pressure in the casing. The production tree can include multiple types of valves and gauges such as a master gate valve, a pressure gauge, a wing valve, a swab valve, and a choke and a number of check valves. The production tree provides production operation control and monitoring. The wellhead provides casing and tubing suspension, and a means to attach a blowout preventer during drilling to avoid high pressure formation induced blowouts.

During the well service life, the wellhead can undergo movement and displacement, often visually observed as a height change (e.g., growth) of the wellhead compared with a previous position. This can be caused by a host of factors including static, thermal, and pressure induced complex wellhead loadings. Wellhead growth caused by temperature and pressure effects during production could be severe and critical, causing well integrity failure and surface equipment damage, sometimes with catastrophic consequences at huge safety risks and economic losses. Being able to detection, quantify and mitigate displacement can have significant economic and safety impact to production fields.

This disclosure provides an approach for measuring wellhead displacement using beam deflection. The wellhead, or a portion of the wellhead, can be illuminated by an infrared light source. The infrared light source can project a pattern of light onto the wellhead (e.g., a pattern of dots). The infrared light can be reflected from features of the wellhead, and the reflected light can be captured by an imaging sensor. Displacement of the wellhead can be determined based on the projected pattern of light and the captured reflected light. The wellhead displacement can be used to trigger corrective actions, for example, when the displacement exceeds a threshold displacement.

Implementations of the systems and methods of this disclosure can provide various technical benefits. A beam deflection approach enables submillimeter features of the wellhead to be tracked over time. The submillimeter features can be linked to the integrity of the wellhead and indicate damage (e.g., erosion, corrosion, and micro-torsions). The beam deflection system can obtain continuous measurements in real-time. The beam deflection approach can obtain wellhead measurements in the presence of environmental and weather based occlusions (e.g., fog, rain, light sandstorms). The beam deflection system can be resilient to deformations (e.g., thermal expansion, mechanical deformation) of the optical system because the beam deflection system can be recalibrated in place using a predefined light pattern projected onto a flat surface. The beam deflection approach is a contactless measurement approach that can be positioned away from the wellhead reducing the requirements for explosion proofing and/or temperature shielding.

The beam deflection system can be adapted for desert environments by tuning the wavelengths of light away from the solar maxima and water absorption wavelengths. Optical components of the system (e.g., photodetectors and imaging sensors) can be mounted on moving stages that can be adjusted to compensate for thermal dilations or recoil of the optical system. The moving stages can be adjusted based on continuous monitoring of the temperature of the system and the deformation of a known pattern. This system enables continuous monitoring of the wellhead displacement enabling preventive maintenance and integrity monitoring.

The details of one or more implementations of these systems and methods are set forth in the accompanying drawings and the description below. Other features, objects, and advantages of these systems and methods will be apparent from the description and drawings, and from the claims.

DESCRIPTION OF DRAWINGS

FIG. 5 is a flow chart for a method for measuring wellhead displacement.

DETAILED DESCRIPTION

Wellheads are a critical part of oil/gas/geothermal drilling, completion, and production systems, acting as both the structural and pressure containing interface. Wellheads include equipment mounted at the opening of the well to regulate and monitor hydrocarbon extraction from a subsurface formation, and typically includes three components: a casing head, a tubing head, and a production tree (colloquially known as a Christmas tree). The casing head can be fitted with valves and plugs to access the well casing. The tubing head can position the tubing correctly in the well and provides reliable well access. The tubing head can be sealed to enable removal of the production tree with pressure in the casing. The production tree can include multiple types of valves and gauges such as a master gate valve, a pressure gauge, a wing valve, a swab valve, and a choke and a number of check valves. The production tree provides production operation control and monitoring. The wellhead provides casing and tubing suspension, and a means to attach a blowout preventer during drilling to avoid high pressure formation induced blowouts.

During the well service life, the wellhead can undergo movement and displacement, often visually observed as a height change (e.g., growth) of the wellhead compared with a previous position. This can be caused by a host of factors including static, thermal, and pressure induced complex wellhead loadings. Wellhead growth caused by temperature and pressure effects during production could be severe and critical, causing well integrity failure and surface equipment damage, sometimes with catastrophic consequences at huge safety risks and economic losses. Being able to detection, quantify and mitigate displacement can have significant economic and safety impact to production fields.

This disclosure provides an approach for measuring wellhead displacement using beam deflection. The wellhead, or a portion of the wellhead, can be illuminated by an infrared light source. The infrared light source can project a pattern of light onto the wellhead (e.g., a pattern of dots). The infrared light can be reflected from features of the wellhead, and the reflected light can be captured by an imaging sensor. Displacement of the wellhead can be determined based on the projected pattern of light and the captured reflected light. The wellhead displacement can be used to trigger corrective actions, for example, when the displacement exceeds a threshold displacement.

Figure 1:
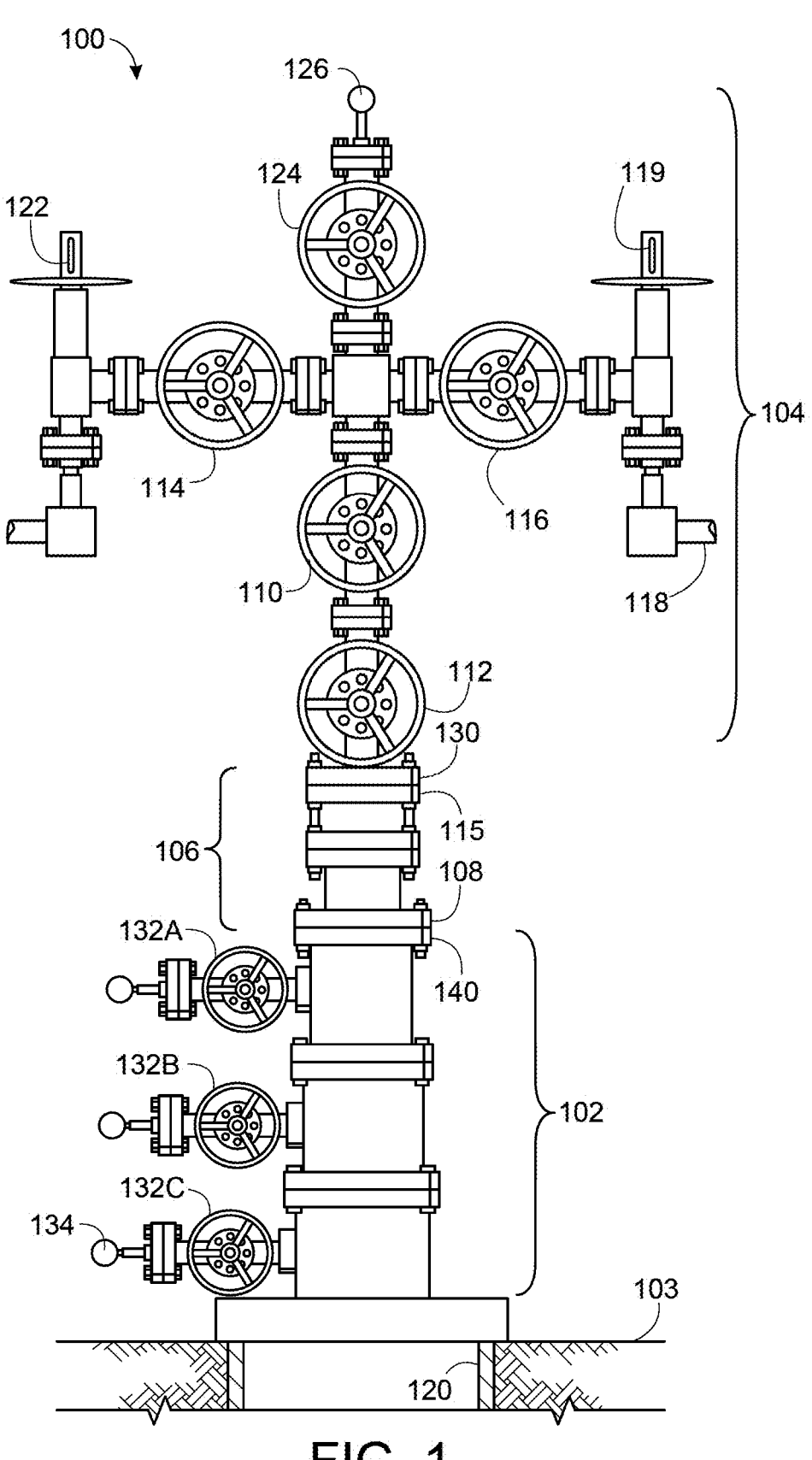
FIG. 1 is a schematic of a wellhead assembly.

FIG. 1 illustrates a wellhead assembly 100 at a surface 116 of a wellbore 120. The wellhead assembly 100 includes a casing spool 102, a production tree 104 fluidly coupled to the wellhead 102, and a tubing bonnet assembly 106 residing between and fluidly coupled to the wellhead 102 and the production tree 104. The tubing bonnet assembly 106 is attached, on a bottom end 108, to a top flange 140 of a tubing spool 142 of the wellhead 102. The tubing bonnet assembly 106 is attached, on a top end 115, to a bottom flange 130 of a valve 132 (for example, a master valve) of the production tree 104.

The wellhead assembly 100 provides a structural and pressure-containing interface between the wellbore 120 and hydrocarbon production equipment. The production tree 104 includes valves 132 to control the pressure and flow of hydrocarbons from the wellbore 120 to the hydrocarbon production equipment. The wellhead assembly 100 can be exposed to harsh environments that may result in structural changes or damage to the wellhead assembly 100 such as anisotropic dilation, fatigue, displacement, corrosion, etc. The structural changes or damage can impair the functioning of the wellhead assembly 100. Without consistent measurement and monitoring, changes or damage to the wellhead assembly 100 could be unnoticed until a failure of the wellhead assembly 100 or its subcomponents.

The casing spool 102 includes casing annulus valves 132A, 132B, and 132C are illustrated. The casing annulus valves 132A-132C control fluid flow in the annular space of wellbore 100. A pressure gauge 134 enables pressure readings at the casing spool 102.

The wellhead assembly 100 includes a system of valves, adapters, and other devices that enable pressure control of a well. In examples, the wellhead includes a Christmas tree. For example, valves above ground level 103 are arranged in a crucifix type pattern and are colloquially referred to as a Christmas tree. In some embodiments, a Christmas tree is an assembly of valves, casing spools, and fittings used to regulate the flow of pipes in an oil well, gas well, water injection well, water disposal well, gas injection well, condensate well, and other types of well. For ease of description, particular components are described with respect to the wellhead assembly 100. However, the wellhead assembly 100 can include any number of components that regulate the flow of hydrocarbons. In some examples, the wellhead assembly 100 includes a frac stack, frac tree, composite frac tree, production tree, and the like.

The wellhead assembly 100 includes multiple valves. The valves include varying valve configurations and combinations of manual and/or actuated (e.g., hydraulic or pneumatic) valves. As shown in FIG. 1, two lower valves are referred to as master valves, an upper master valve 110 and lower master valve 112. The master valves 110 and 112 are in a fully open position after completion of the well and are not opened or closed when the well is flowing (except in an emergency) to prevent erosion of the valve sealing surfaces. In some embodiments, the lower master valve 112 is manually operated and the upper master valve 110 is hydraulically actuated. In some implementations, the upper master valve 110 is controlled from a remote location and enables remote shutting in of the well in the event of emergency.

The wellhead assembly 100 includes a kill wing valve 114 and a flow wing valve 116. In some embodiments, the wing valves 114 and 116 are hydraulically actuated. The flow wing valve 116 enables hydrocarbons to flow from the well, to a flowline 118. The flowline 118 defines the path that the hydrocarbons take to production facilities (or the path water or gas will take from production to the well in the case of injection wells). An emergency shutdown device 119 can be used to remotely shut in the well in case of an emergency. In examples, kill wing valve 114 is used for injection of fluids such as corrosion inhibitors or methanol to prevent hydrate formation. In some embodiments, the kill wing valve 114 is manually operated. As shown in FIG. 1, a pressure gauge 122 at the production tree 104 can be used to monitor pressure at the wellhead.

The wellhead assembly 100 also includes a swab valve 124 that is used for well interventions like wireline and coiled tubing. For such operations, a lubricator is rigged up onto the top of the production tree 104 and the wire or coil is lowered through the lubricator, past the swab valve 124 and into the well. In some examples, the swab valve 124 is manually operated. A needle valve 126 is used to start, stop, and regulate the flow rate at the wellhead. In some embodiments, the needle valve 126 enables rigging down equipment from the top of the wellhead assembly 100 with the well flowing while ensuring two barriers separate hydrocarbons from the swab valve 124.

Figure 2:
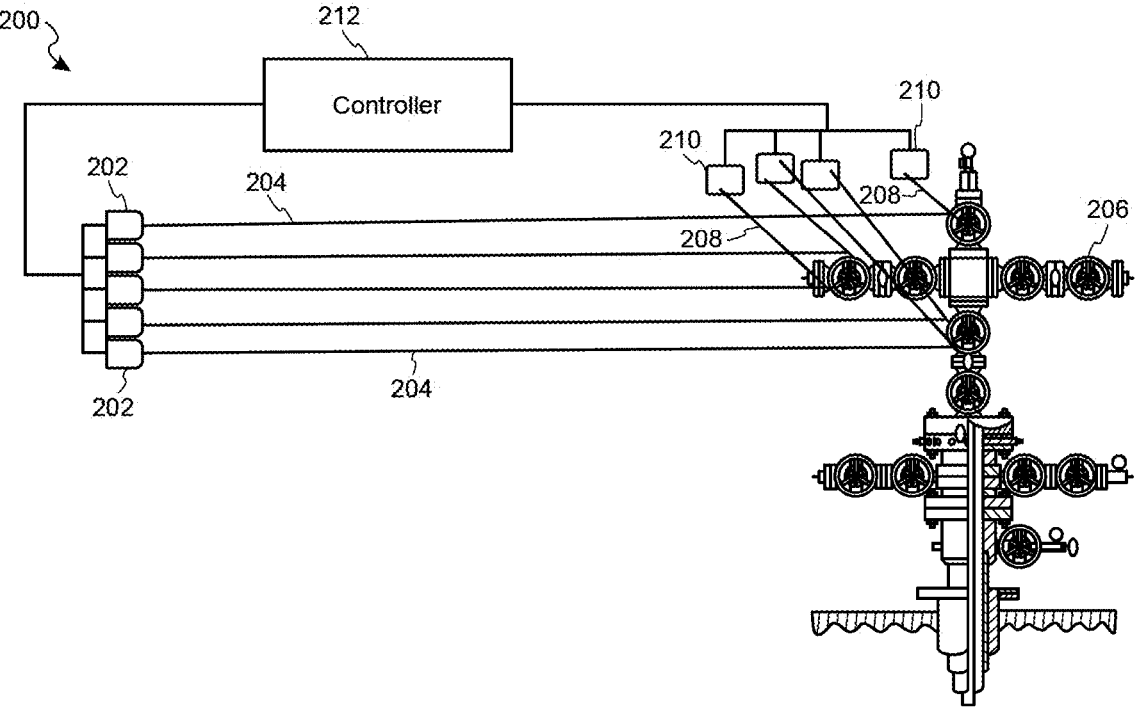
FIG. 2 is an illustration of a beam deflection measurement system.

FIG. 2 illustrates an example beam deflection system 200 for measuring displacement of a wellhead 206. System 200 includes multiple light sources 202 to generate beams of light 204 that illuminate a portion of the wellhead 206. The beams of light 204 reflect off of the portions of the wellhead 206 to form the reflected beams 208. An array of imaging sensors 210 capture the reflected beams 208.

The light sources 202 can include, for example, infrared lasers or super luminescent diodes (SLDs) that can generate coherent light. The light sources 202 can have a wavelength in the long-wavelength infrared range (e.g., 8 to 14 micrometers). The wavelength of the light source can be chosen in the long-wavelength infrared spectrum to minimize scattering due to the roughness of the object, reduce absorption from atmospheric gases such as water vapor, and to be away from peak wavelengths of solar radiation. Water vapor absorption wavelengths are centered at 1.38, 1.87, 2.7, 6.3, and 71 micrometers. Solar maxima wavelengths have maximum intensity around 500 nanometers and can extend from 300 nanometers to 3 micrometers.

The light sources 202 can be arranged to project a pattern onto the wellhead 206. For example, the light sources 202 can project a pattern of dots onto the wellhead 206. Each light source 202 can produce a single light beam that is projected onto the wellhead 206. In some implementations, each light source 202 projects a pattern of light onto the wellhead 206. For example, the light from each light source 202 can be divided into multiple beams that project a pattern of tiny dots of light onto a feature of the wellhead 206. Diffractive optical elements can be placed in the optical path of each light source 202 to generate the pattern of light. Example features of interest on the wellhead 206 include valves, welds, joints, flowlines, gauges, etc.

The angle of reflection of the beams 208 is determined by the curvature of the surface on which the beams 204 impinge, and the angle of incidence of the beams 204 on the surface. When the surface changes, the angle of reflection changes which can be captured by the imaging sensors 210.

The reflected beams 208 are captured by the imaging sensors 210. The imaging sensors can be, for example, photodetectors, complementary metal-oxide semiconductor (CMOS) sensors, and/or charge coupled device (CCD) sensors. Each sensor 210 can be configured to capture a single reflected beam 208 or multiple reflected beams 208. The position of each sensor 210 can be determined during installation of the system 200 with respect to a center of origin. The center of origin can be independent of the position of the wellhead. In implementations, where each light source projects its own pattern of light, the imaging sensors 210 can be configured to capture the reflected pattern of light. The imaging sensors 210 can be angle-sensitive. For example, the imaging sensors 210 can record the direction (e.g., angle of incidence) of the incoming reflected beams 210. The imaging sensors 210 can also record the time of arrival of the reflected beams 208.

The system 200 includes a controller 212. The controller 212 can be a computer system or data processing system (e.g., the computer system of FIG. 6). The controller 212 is communicatively coupled to the light sources 202 and the imaging sensors 210. The controller 212 can control the emission of light from the light sources 202 by, for example, sending an electronic trigger pulse to the light sources 202 to cause the light source 202 to emit light. The controller 212 receives electronic signals from the imaging sensors 210 indicating the position, direction, intensity, and/or the time of arrival of the reflected beams. The data from the imaging sensors 210 can be digital images of the reflected beams 208 (e.g., images of the reflected pattern) and/or voltage values from individual sensor elements (e.g., pixels) or photodetectors. The controller 212 can be configured to measure a displacement of the wellhead based on the transmitted and reflected light.

Figure 3A:
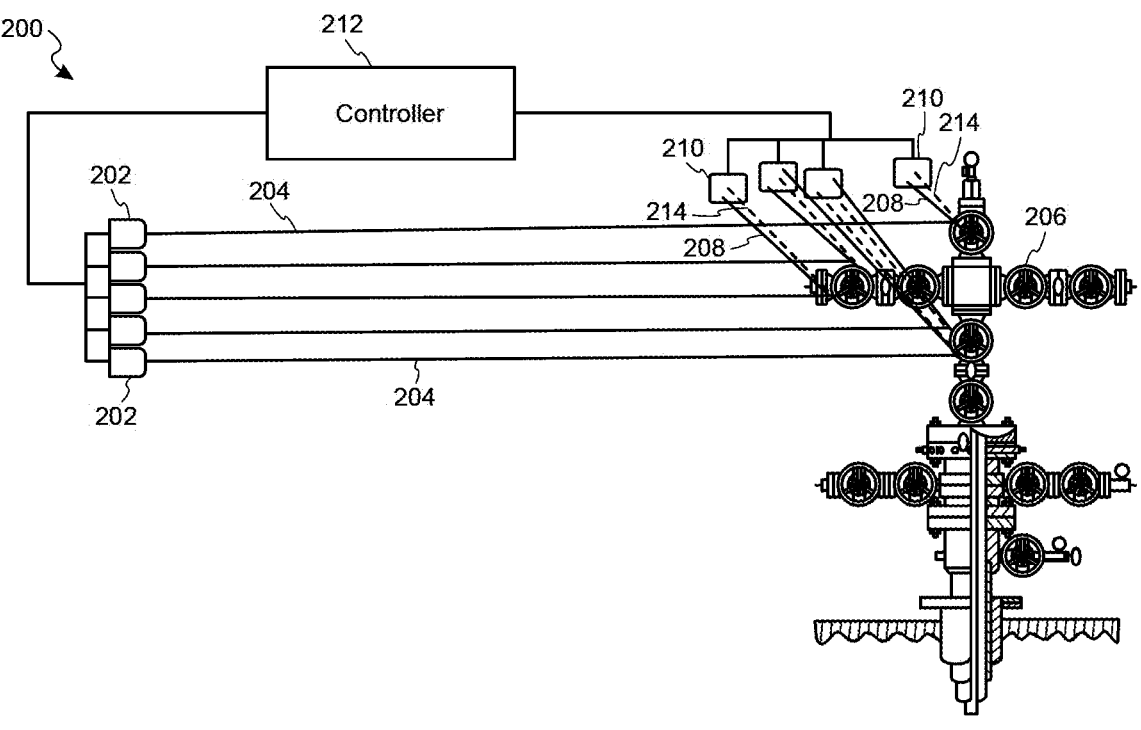
FIG. 3A is an illustration of the beam deflection measurement system at a second instance in time.
Figure 3B:
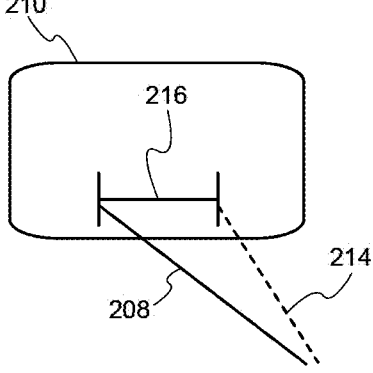
FIG. 3B is an illustration of beam deflection on an imaging sensor due to displacement of the wellhead.

FIGS. 3A and 3B illustrate the system 200 at a second instance in time after a displacement of the wellhead has occurred. Displacement of the wellhead 206 causes the angle of reflection of the light beams 204. The reflected light 208 from the initial position of the wellhead is shown in solid lines. The displaced reflected light 214 is shown in dotted lines. The displacement 216 can be measure as a physical distance on the sensor 210. The actual displacement of the wellhead can be determined based on the displacement 216 and the location of the sensor 210 relative to the wellhead 206.

In some implementations, the controller 212 uses the relative displacement of the reflected beams 208 on each of the sensors to determine the overall displacement of the wellhead 206. For example, each reflected light beam 208 can displace a different amount on the respective imaging sensors 210 creating a deformed pattern of light as compared with the initial pattern of light. The controller can determine the wellhead displacement based on the deformed pattern of light using computer vision techniques such as structured light or pattern recognition.

Figure 4:
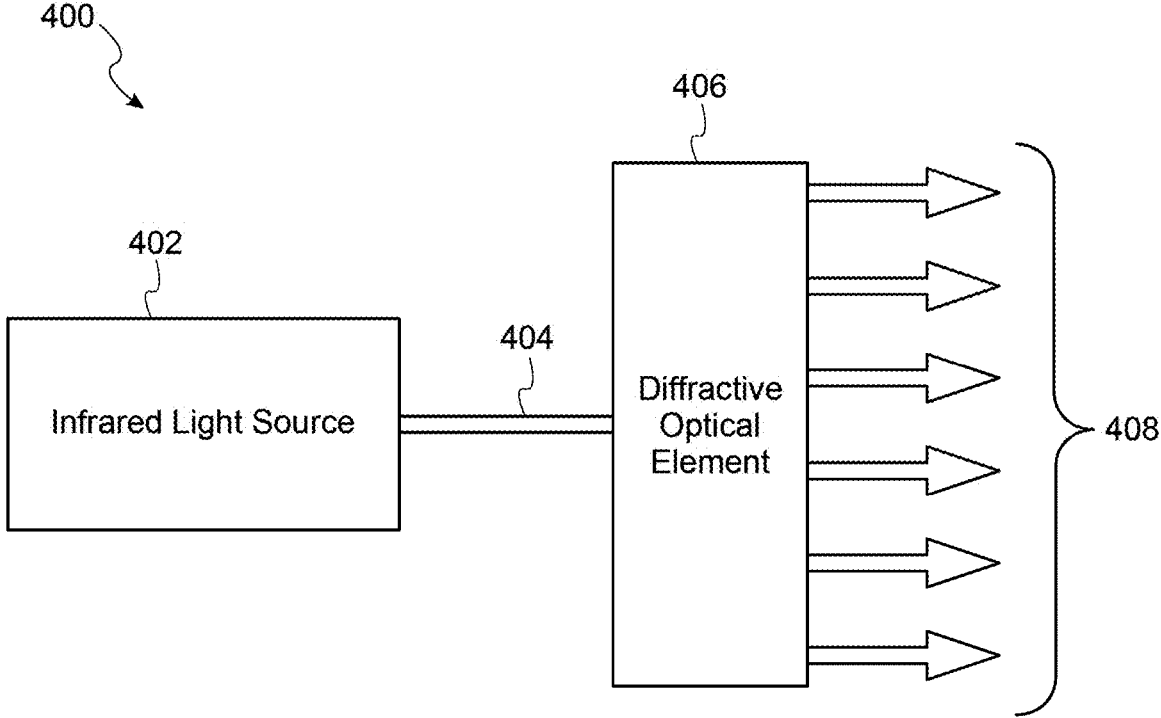
FIG. 4 is a schematic of an illumination system with a diffractive optical element.

FIG. 4 is a schematic of an example illumination system 400. The illumination system 400 includes an infrared light source 402 (e.g., a laser or an SLD). The light source 402 can be coupled with optical elements (e.g., filters and lenses) to generate a single beam of coherent light 404. The light 404 is transmitted through a diffractive optical element 406. The diffractive optical element 406 splits the light 404 into multiple beams 408. The diffractive optical element 406 can create a pattern of dots (e.g., dots arranged in a line) or a pattern of lines. In some implementations, multiple diffractive optical elements 406 can be used in series to generate additional patterns. For example, a diffractive optical element 406 can be used to generate a vertical column of 6 dots, and a second diffractive optical element 406 can be oriented to create a horizontal row of 6 dots. When the column of 6 dots encounters the second diffractive optical element, each of the 6 dots is split into 6 dots in a horizontal row thereby creating a 6×6 array of light dots. In some implementations, the diffractive optical element 406 generates a randomized pattern of dots.

FIG. 5 is a flow chart for an example method 500 for measuring displacement of a wellhead. The method 500 can be implemented on a data processing system (e.g., data processing system 212, or the computer system of FIG. 6).

The data processing system projects a pattern of infrared light onto a portion of a wellhead (step 502). For example, the data processing system controls one or more infrared light sources to generate and project the pattern of light.

The data processing system captures reflections of the pattern of light from the portion of the wellhead using an imaging sensor (step 504). For example, the data processing system receives electronic signals from the imaging sensor indicating the location, angle of incidence, intensity, and/or the time of arrival of the reflected pattern of light. The imaging sensor can be, for example, a photodetector, an angle-sensitive CMOS sensor, or an angle-sensitive CCD sensor. The data processing system can compare the time of arrival of the light at the imaging sensor with the time of emission to determine the distance that the light traveled. Time of arrival can also be used in time-of-flight techniques to determine distances to objects. For example, light detection and ranging (LIDAR) techniques can be used with the time of arrival data.

The data processing system measures a displacement of the wellhead based on the projected pattern of infrared light and the reflections (step 506). For example, the data processing system can determine a displacement of the wellhead based on a displacement of a beam of light on the imaging sensor. In some implementations, the data processing system determines the displacement of the wellhead based on deformation of the pattern of light. For example, the projected pattern of light is known, and expected positions of the reflected beams can be determined using a baseline position (or a previous position) of the wellhead. The detected positions captured by the imaging sensor can be compared with the expected positions to measure the displacement.

In some implementations, the pattern of light is a single beam of light. The data processing system can determine the displacement of the wellhead based on the angle between the initial, non-displaced beam, the displaced beam, and the distance of the sensor from the wellhead.

In some implementations, the data processing system uses a trained machine learning model to correlate the speckle interferogram with the reference speckle interferogram. The machine learning model can take as input the two interferograms and produce as output the correlation value. Additionally, or alternatively, the machine learning model can produce as output locations in the interferograms with poor correlation.

The data processing system measures a displacement of the wellhead based on the correlation of the speckle interferogram and the reference speckle interferogram (step 506). The data processing system is capable of determining sub-millimeter displacements based on the speckle interferograms. For example, the data processing system can determine displacements of a half-wavelength of the source light or more.

In some implementations, the data processing system iteratively measures displacements of the portion of the wellhead at multiple instances of time to generate a time-history of the displacements. The time-history of displacements can be used to assess the movement of the wellhead over time. The time-history can be used to identify anomalies in the wellhead and/or changes in the performance or condition of the wellhead. The data processing system can predict anomalies of the wellhead using a machine learning model that takes as input the time-history of the displacements and outputs the location and/or the severity of the anomalies. The data processing system can process the time-history to identify data trends indicative of potential failures or damage.

In response to determining that the displacement exceeds a threshold displacement, the data processing system can perform a corrective action to remedy the detected displacement. For example, the data processing system can generate an alert that the displacement exceeds the threshold displacement. The data processing system can generate an audio alert, a visual alert or both. The alert can indicate a preventive maintenance task to be performed by personnel. In some implementations, the data processing system can adjust valve positions to reduce the flow of hydrocarbons in the wellhead based on determining that the displacement exceeds the threshold displacement.

Figure 6:
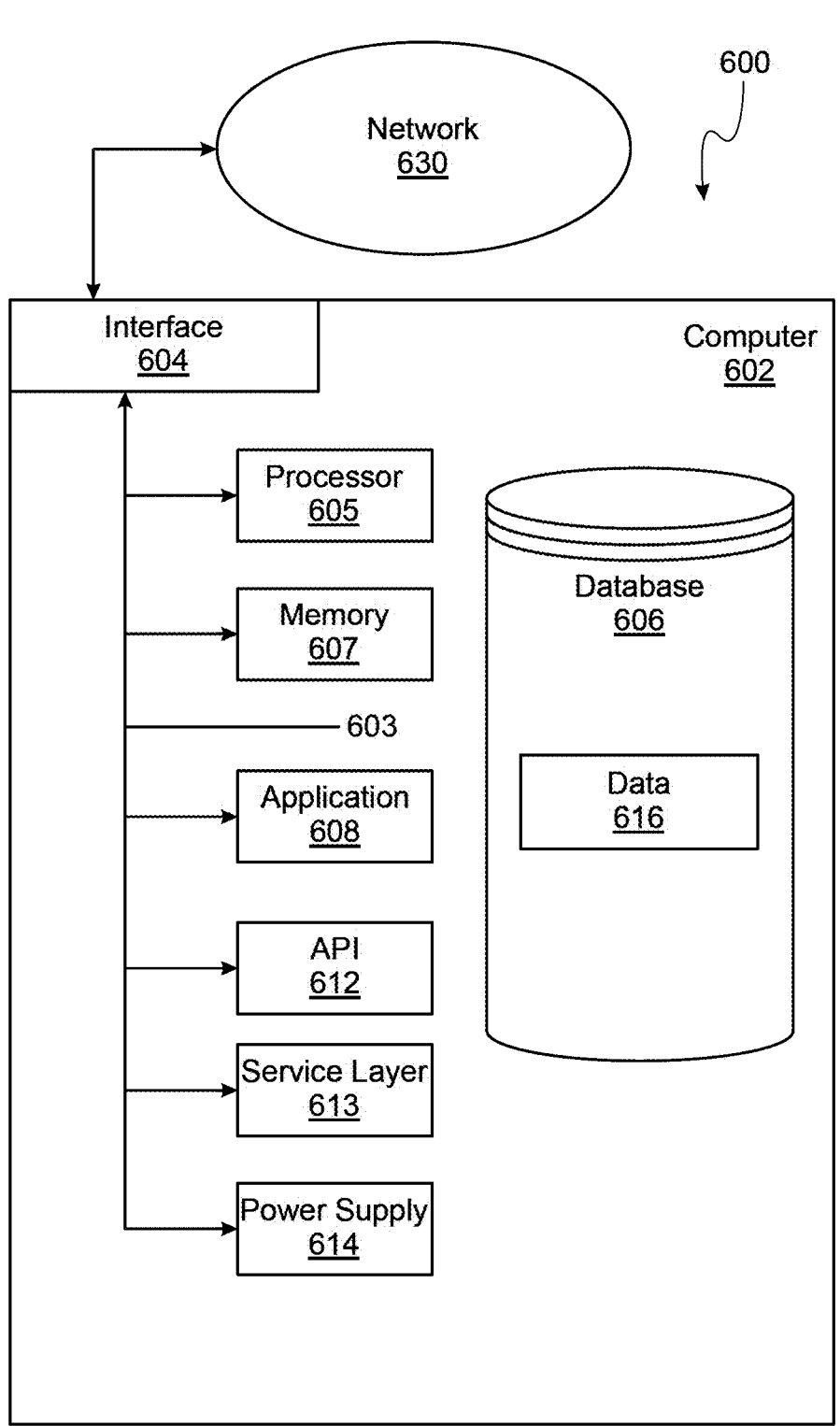
FIG. 6 is a block diagram illustrating an example computer system used to provide computational functionalities associated with described algorithms, methods, functions, processes, flows, and procedures according to some implementations of the present disclosure. Like reference symbols in the various drawings indicate like elements.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can hold data 616 (e.g., resistivity data). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method;

a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of these systems and methods have been described. Nevertheless, it will be understood that various modifications may be made without departing from the spirit and scope of this disclosure. Accordingly, other implementations are within the scope of the following claims.

EXAMPLES

In an example implementation, a method for performing contactless wellhead displacement measurements in a desert environment includes adjusting an alignment of optical components in an optical system based on a temperature of the optical system; projecting a pattern of infrared light from the optical system onto a portion of a wellhead, the infrared light having a wavelength away from water absorption wavelengths and solar maxima wavelengths; capturing reflections of the pattern of infrared light from the portion of the wellhead using an imaging sensor of the optical system; and measuring a displacement of the wellhead based on the projected pattern of infrared light and the reflections.

An aspect combinable with the example implementation includes in response to determining that the displacement exceeds a threshold displacement, performing a corrective action.

In another aspect combinable with one, some, or all of the previous aspects, performing the corrective action includes generating an alert that the displacement exceeds the threshold displacement.

In another aspect combinable with one, some, or all of the previous aspects, projecting the pattern of infrared light includes transmitting infrared light through a diffractive optical element to form the pattern of infrared light.

In another aspect combinable with one, some, or all of the previous aspects, projecting the pattern of infrared light includes controlling multiple infrared light sources to form the pattern of infrared light.

In another aspect combinable with one, some, or all of the previous aspects, the imaging sensor includes an angle-sensitive complementary metal-oxide semiconductor (CMOS) sensor or an angle-sensitive charge coupled device (CCD) sensor.

Another aspect combinable with one, some, or all of the previous aspects includes determining a time of arrival and an angle of incidence of the reflection, where measuring the displacement is further based on the time of arrival and the angle of incidence of the reflection.

Another aspect combinable with one, some, or all of the previous aspects includes iteratively measuring displacements of the portion of the wellhead at multiple instances of time to generate a time-history of the displacements.

Another aspect combinable with one, some, or all of the previous aspects includes predicting anomalies of the wellhead using a machine learning model that takes as input the time-history of the displacements.

In another example implementation, a system for performing contactless wellhead displacement measurements in a desert environment includes an infrared light source to illuminate a portion of the wellhead, the infrared light source having a wavelength away from water absorption wavelengths and solar maxima wavelength; a diffractive optical element to generate a pattern of light from the infrared light source; an imaging sensor to capture the pattern of light reflected from the portion of the wellhead; and a computer system configured to adjust an alignment of the infrared light source, the diffractive optical element and the imaging sensor based on a temperature of the system and measure a displacement of the wellhead based on the captured pattern of light.

In an aspect combinable with the example implementation, the infrared light source includes a long wavelength infrared light source.

In another aspect combinable with one, some, or all of the previous aspects, the infrared light source includes a wavelength in the range of 8 to 14 micrometers.

In another aspect combinable with one, some, or all of the previous aspects, the imaging sensor includes an angle-sensitive complementary metal-oxide semiconductor (CMOS) sensor or an angle-sensitive charge coupled device (CCD) sensor.

In another aspect combinable with one, some, or all of the previous aspects, the infrared light source includes a laser or a super luminescent diode.

In another aspect combinable with one, some, or all of the previous aspects, the pattern of light includes a plurality of dots.

Another aspect combinable with one, some, or all of the previous aspects includes a bandpass filter coupled to the imaging sensor to filter undesired wavelengths from the pattern of light reflected from the portion of the wellhead.

In another aspect combinable with one, some, or all of the previous aspects, the computer system is further configured to project the pattern of infrared light onto the portion of the wellhead; capture reflections of the pattern of infrared light from the portion of the wellhead using the imaging sensor; and measure the displacement of the wellhead based on the projected pattern of infrared light and the reflections.

In another aspect combinable with one, some, or all of the previous aspects, the imaging sensor includes an angle-sensitive complementary metal-oxide semiconductor (CMOS) sensor or an angle-sensitive charge coupled device (CCD) sensor; and the computer system is further configured to determine a time of arrival and an angle of incidence of the reflection, where measuring the displacement is further based on the time of arrival and the angle of incidence of the reflection.

In another aspect combinable with one, some, or all of the previous aspects, the computer system is further configured to iteratively measure displacements of the portion of the wellhead at multiple instances of time to generate a time-history of the displacements.

In another aspect combinable with one, some, or all of the previous aspect, the computer system is further configured to predict anomalies of the wellhead using a machine learning model that takes as input the time-history of the displacements.

What is claimed is:

1. A method for performing contactless wellhead displacement measurements in a desert environment, the method comprising:

adjusting an alignment of optical components in an optical system based on a temperature of the optical system;

projecting a pattern of infrared light from the optical system onto a portion of a wellhead, the infrared light having a wavelength away from water absorption wavelengths and solar maxima wavelengths;

capturing reflections of the pattern of infrared light from the portion of the wellhead using an imaging sensor of the optical system; and measuring a displacement of the wellhead based on the projected pattern of infrared light and the reflections.

2. The method of claim 1, further comprising in response to determining that the displacement exceeds a threshold displacement, performing a corrective action.

3. The method of claim 2, wherein performing the corrective action comprises generating an alert that the displacement exceeds the threshold displacement.

4. The method of claim 1, wherein projecting the pattern of infrared light comprises transmitting infrared light through a diffractive optical element to form the pattern of infrared light.

5. The method of claim 1, wherein projecting the pattern of infrared light comprises controlling multiple infrared light sources to form the pattern of infrared light.

6. The method of claim 1, wherein the imaging sensor comprises an angle-sensitive complementary metal-oxide semiconductor (CMOS) sensor or an angle-sensitive charge coupled device (CCD) sensor.

7. The method of claim 6, further comprising determining a time of arrival and an angle of incidence of the reflection, wherein measuring the displacement is further based on the time of arrival and the angle of incidence of the reflection.

8. The method of claim 1, further comprising iteratively measuring displacements of the portion of the wellhead at multiple instances of time to generate a time-history of the displacements.

9. The method of claim 8, further comprising predicting anomalies of the wellhead using a machine learning model that takes as input the time-history of the displacements.

10. A system for performing contactless wellhead displacement measurements in a desert environment, the system comprising:

an infrared light source to illuminate a portion of the wellhead, the infrared light source having a wavelength away from water absorption wavelengths and solar maxima wavelength;

a diffractive optical element to generate a pattern of light from the infrared light source;

an imaging sensor to capture the pattern of light reflected from the portion of the wellhead; and a computer system configured to adjust an alignment of the infrared light source, the diffractive optical element and the imaging sensor based on a temperature of the system and measure a displacement of the wellhead based on the captured pattern of light.

11. The system of claim 10, wherein the infrared light source comprises a long wavelength infrared light source.

12. The system of claim 11, wherein the infrared light source comprises a wavelength in the range of 8 to 14 micrometers.

13. The system of claim 10, wherein the imaging sensor comprises an angle-sensitive complementary metal-oxide semiconductor (CMOS) sensor or an angle-sensitive charge coupled device (CCD) sensor.

14. The system of claim 10, wherein the infrared light source comprises a laser or a super luminescent diode.

15. The system of claim 10, wherein the pattern of light comprises a plurality of dots.

16. The system of claim 10, further comprising a bandpass filter coupled to the imaging sensor to filter undesired wavelengths from the pattern of light reflected from the portion of the wellhead.

17. The system of claim 10, wherein the computer system is further configured to:

project the pattern of infrared light onto the portion of the wellhead;

capture reflections of the pattern of infrared light from the portion of the wellhead using the imaging sensor; and measure the displacement of the wellhead based on the projected pattern of infrared light and the reflections.

18. The system of claim 17, wherein the imaging sensor comprises an angle-sensitive complementary metal-oxide semiconductor (CMOS) sensor or an angle-sensitive charge coupled device (CCD) sensor; and wherein the computer system is further configured to determine a time of arrival and an angle of incidence of the reflection, wherein measuring the displacement is further based on the time of arrival and the angle of incidence of the reflection.

19. The system of claim 17, wherein the computer system is further configured to iteratively measure displacements of the portion of the wellhead at multiple instances of time to generate a time-history of the displacements.

20. The system of claim 19, wherein the computer system is further configured to predict anomalies of the wellhead using a machine learning model that takes as input the time-history of the displacements.

* * * * *